United States Patent [19]
Tachikura et al.

[11] Patent Number: 6,115,522
[45] Date of Patent: Sep. 5, 2000

[54] OPTICAL FIBER CORD AND OPTICAL CORD RIBBON

[75] Inventors: Masao Tachikura; Hajime Takemoto; Shigenori Uruno; Isao Nakanishi, all of Tokyo, Japan

[73] Assignee: Nippon Telegraph and Telephone Corporation, Japan

[21] Appl. No.: 09/097,870

[22] Filed: Jun. 16, 1998

[30] Foreign Application Priority Data

Jun. 18, 1997 [JP] Japan ..................................... 9-161270
Jun. 9, 1998 [JP] Japan ................................... 10-160342

[51] Int. Cl.[7] ..................................................... G02B 6/44
[52] U.S. Cl. .......................... 385/102; 385/103; 385/104; 385/105; 385/106; 385/107; 385/112; 385/113
[58] Field of Search ..................................... 385/102, 103, 385/104, 105, 106, 107, 108, 113, 112

[56] References Cited

U.S. PATENT DOCUMENTS

| | | | |
|---|---|---|---|
| 4,741,594 | 5/1988 | Suzuki | 359/124 |
| 5,448,670 | 9/1995 | Blew et al. | 385/112 |
| 5,668,912 | 9/1997 | Keller | 385/100 |
| 5,802,231 | 9/1998 | Nagano et al. | 385/114 |

FOREIGN PATENT DOCUMENTS

| | | |
|---|---|---|
| 856761A1 | 8/1998 | European Pat. Off. . |
| 53-144757 | of 1978 | Japan . |
| 60-86515 | of 1985 | Japan . |
| 8211259 | of 1996 | Japan . |
| 8304675 | of 1996 | Japan . |
| 8327833 | of 1996 | Japan . |

OTHER PUBLICATIONS

JP 60-107041 A (Oji Paper Co.) Dec. 6, 1985 (abstract), retrieved on Jun. 18, 1999, retrieved from EPO WPI Database.

Tachikura et al.: Miniature Optical Cords with High Flexural Rigidity (Discourse No. B-10-76, p. 585 of vol. 2 of Proceedings of the 1997 IEICE General Conference, published by the communication Engineerings on Mar. 6, 1997)—(Also attached is the Technical Digest written in English corresponding to the above document).

*Primary Examiner*—Cassandra Spyrou
*Assistant Examiner*—Mohammad Y. Sikder
*Attorney, Agent, or Firm*—Ostrolenk, Faber, Gerb & Soffen, LLP

[57] ABSTRACT

A mono-fiber type optical fiber cord comprising: a coated optical fiber which is an optical fiber with a fiber coat therearound, a synthetic resin coat having a substantially rectangular sectional surface for further covering the coated optical fiber, and a reinforcing member within the coat for coated optical fiber, wherein the reinforcing member is located along one of the shorter sides of the coat in the substantially parallel direction with the shorter sides in such a manner as to be embedded along the longitudinally extending direction of the coated optical fiber. An optical cord ribbon is formed by mutually bonding the longer sides of the adjacent substantially rectangular sectional surfaces of a plurality of the mono-fiber type optical fiber cords, and thereafter by coating the external surface of the thus aligned optical fiber cords by a bundling coating method.

13 Claims, 12 Drawing Sheets

OPTICAL FIBER CORD AND OPTICAL CORD RIBBON

This application is based on Patent Application No. 161,270/1997 filed Jun. 18, 1997 in Japan, the content of which is incorporated hereinto by reference.

BACKGROUND OF THE INVENTION

1. Field of the Invention

The present invention relates to an optical fiber cord and an optical cord ribbon.

In accordance with the recent progress of optical telecommunication technology, there is an increase in the number of requests for employing optical fiber cables in the subscribers, system including personal or regular subscribers, and there will be requirements of as many as 100,000 fibers in a central office in the near future.

In order to avoid the optical fibers getting damaged during the cable distributing operation in central offices, an optical fiber cord of a specific structure, such as the one being formed by applying reinforcing members of high-resiliency along the longitudinal direction of a coated fiber, and by coating synthetic resin therearound, is needed.

2. Description of the Related Art

FIG. 20 shows an explanatory view showing a sectional surface of a conventional mono-fiber type optical fiber cord. FIG. 21 shows a multi-fiber type optical fiber cord. The mono-fiber type optical fiber cord 3 in FIG. 20 (hereinafter referred to simply as "mono-fiber cord") shows a structure that an optical fiber 11 and a coat 32 applied thereto (hereinafter referred to as an "optical-fiber coat" or just "fiber coat") configures a coated optical fiber 33, and a reinforcing member 34 and an outer sheath 35 are applied to the outermost side thereof. The outside diameter of a standard coated fiber is normally 0.25 to 0.9 mm, and that of the optical fiber cord 3 containing the coated fiber is at least 1.7 mm or so. The reinforcing member 34 (hereinafter may be referred to just as "strength member") is, in most occasions, made of aramid yarn. In this way, the optical fiber cord 3 is made much larger in size than the coated optical fiber 33 itself. Accordingly, since cables formed by assembling a plurality of mono-fiber cords are conventionally used for an office-site cable distribution, there has been a problem that if the number of cords to be assembled is increased, the total size thereof is made extremely large, and thus a lot of space for cable distribution is needed.

The multi-fiber type optical fiber cord 4 (hereinafter referred to simply as a "multi-fiber cord") shown in FIG. 21 is constructed such that four coated optical fibers 33 each formed by an optical fiber 11 and an optical fiber coat 32 are laterally aligned (in the case of the figure), a bundling coat 41 is applied integrally to the thus aligned coated fibers 33 to form an optical fiber ribbon, the external face of the thus formed fiber ribbon is supported by aramid yarn in the longitudinal direction thereof as a strength member 42, and further an outer sheath 43 made of synthetic resin is applied therearound. The multi-fiber cord 4 formed in the above manner normally adopts four-fiber or eight-fiber optical fiber ribbon therein. Since the sectional area per fiber of the multi-fiber cord is much smaller than that of the conventional mono-fiber cord, it will be advantageous in that a high-density accommodation of the optical fibers is enabled if it is used as an office-site optical fiber cable. However, since the connections for all the fibers are to be changed by use of connectors at the main distribution board within the office site, there causes such a problem that the multi-fiber cord must be converted to individual mono-fiber cord. Note that the wording "connection" or "connecting" includes the meaning of "splice" or "splicing" throughout the present specification.

Conventionally, two methods have been adopted to perform a mono-cord to multiple-cord conversion or the other way round (hereinafter referred to just as a mono-multi or multi-mono cord conversion). One of the methods is to form a connection point, which, though, will raise a total cost as it requires for connecting operations and connecting members. In addition, there are also such problems as necessity of accommodation of the connecting point, an increase of optical loss and so on. The other method is to open up the leading end of the multi-fiber cord to divide it to a plurality of individual coated fibers, and thereafter cover each of the coated fibers by tubes to form a plurality of optical fiber cords. Although this method does not cause such a problem as an increase of optical loss due to the fact that there is no need for a connecting point therein, the dividing operation requires for a high-leveled manual skill, and in addition, in the case that even only one fiber is damaged, the entire multi-fiber cord including the damaged portion must be cut to a required length and execute the same manual operation all over again, so that when an optical cord of a predetermined length is designated, the total cost will be extremely raised.

In order to solve the aforementioned problems such as the increased size of mono-fiber cord, the necessity of mono-multi or multi-mono cord conversion and so on, there has been proposed a new optical fiber cord constructed as a trial structure, which is disclosed in a paper "a small-diameter cord with increased flexural rigidity" by Hajime Takemoto, and Masao Tachikura (Discourse number B-10-76, page 585 of volume 2 of Proceedings of the 1998 IEICE General conference, published by the Institute of Electronics, Information and Communication Engineerings on Mar. 6, 1997).

One of the structures disclosed in the paper is shown in FIG. 22, which has an outside diameter of 0.25 mm, and the diameter of the coated optical fiber itself is 0.15 mm. Although this fiber cord has completed the purpose of minimizing the diameter thereof, as a plurality of steel wires (12 wires in the figure) each having a diameter of 0.045 mm are provided around the coated optical fiber, the removing operation of the coat for the optical fiber is made more difficult. Further, as the outside diameter of the coated fiber is made smaller than 0.25 mm, the fiber coat is also made thin and thus it gets readily damaged.

SUMMARY OF THE INVENTION

The present invention has been achieved to solve the above-described problem and an object of the present invention is to provide an optical fiber cord and an optical cord ribbon capable of minimizing the outside diameter thereof, providing an easy mono-multi or multi-mono cord conversion, and also suitable for mutual multi-fiber connection of the fiber cord ribbons.

In order to solve the problems aforementioned, a mono-fiber type optical fiber cord according to the present invention is constructed such that it comprises: a coated optical fiber composed of an optical fiber and a fiber coat for covering the optical fiber; a coat for coated optical fiber that covers the coated fiber, and having a substantially rectangular sectional surface; and a reinforcing member within the coat for coated optical fiber, wherein the reinforcing member is located along one of the shorter sides of the coat in the substantially parallel direction therewith in such a manner as to be embedded along the longitudinally extending direction of the coated optical fiber. The mono-fiber type optical fiber cord according to the present invention may also be constructed in such a manner as to be provided with a protection jacket that coats the mono-fiber cord.

The optical cord ribbon according to the present invention is constructed such that it comprises: a plurality of mono-fiber type optical fiber cords, and a bundling coat for integrally coating the plurality of mono-fiber type optical fiber cords: each of which plurality of mono-fiber type optical fiber cords having; a coated optical fiber cord composed of an optical fiber and a fiber coat for covering the optical fiber; a coat for coated optical fiber for covering the coated fiber, and having a substantially rectangular sectional surface; and a reinforcing member within the coat for coated optical fiber, wherein the reinforcing member is located along one of the shorter sides of the coat in the substantially parallel direction with the shorter sides in such a manner as to be embedded along the longitudinally extending direction of said coated optical fiber, while the bundling coat is integrally coated on the plurality of mono-fiber type optical fiber cords, the longer sides of adjacent mono-fiber type fiber cords being abutted to each other, and each of the reinforcing members are aligned in a side-by-side manner altogether.

In this case above, it is preferable that the coat for protecting the optical fiber cord and the optical cord ribbon according to the present invention are both made of an ultraviolet curing resin, wherein the latter coat can be destructed more easily than the former coat.

According to the present invention, by adopting generally flat strength members, for example by adopting one or more than one strength members of high elastic modulus along the longitudinal direction of the coated fiber, the mono-fiber type optical fiber cord can be made thinner and lighter, yet a destruction due to the bending force can be prevented.

Further, in the mono-fiber type optical fiber cord, the locations of the strength members are eccentrically biased towards one side of the coated fiber, so that an optical cord ribbon can be constructed by combining a plurality of the mono-fiber type optical fiber cords. For this reason, according to the optical cord ribbon of the present invention, as the strength members are eccentrically biased towards one side of the coated fibers, these strength members can be readily removed in case for connection of the optical fibers.

The above and other objects, effects, features and advantages of the present invention will become more apparent from the following description of embodiments thereof taken in conjunction with the accompanying drawings.

DETAILED DESCRIPTION OF THE PREFERRED EMBODIMENTS

The present invention is now explained into details with reference to the attached figures.

Figure 1:
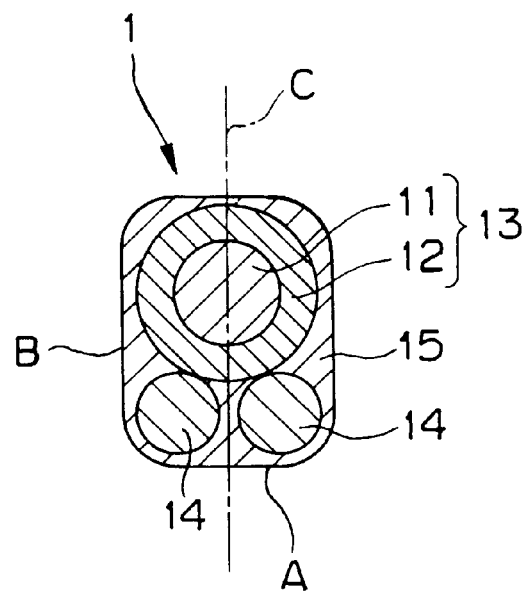
FIG. 1 is a sectional view showing one embodiment of a construction of a mono-fiber cord of the present invention.

FIG. 1 is a sectional view showing an embodiment of a mono-fiber cord 1 according to the present invention. In FIG. 1, the optical fiber 11 and a fiber coat 12 applied to the optical fiber 11 configure a coated optical fiber 13. The coated optical fiber 13 and two reinforcing rods 14 (hereinafter referred to just as "strength rods") configuring the strength member are coated by a coat for mono-fiber cord 15 having a substantially square sectional surface, configuring an optical fiber cord 1. Here, the strength rods 14 are put in a side-by-side manner along and in parallel with one of the shorter sides of the coat for mono-fiber cord 15, in an embedded form along the longitudinal direction of the coated optical fiber 13.

Figure 14:
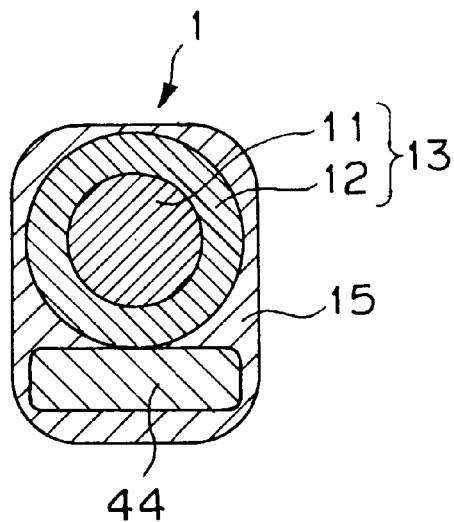
FIG. 14 is a sectional view showing another embodiment of a construction of the mono-fiber cord of the present invention.
Figure 15:
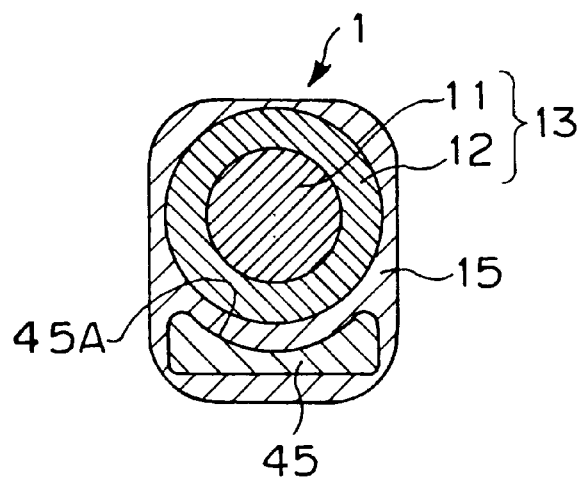
FIG. 15 is a sectional view showing another embodiment of a construction of the mono-fiber cord of the present invention.
Figure 16:
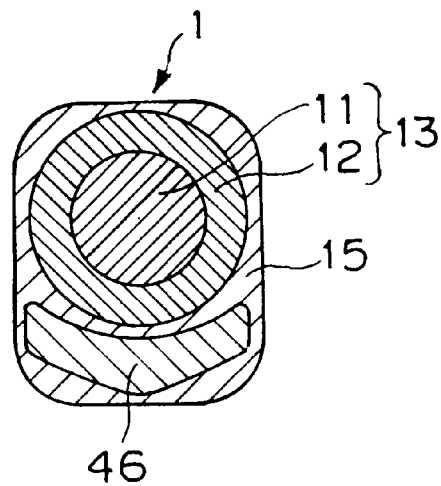
FIG. 16 is a sectional view showing another embodiment of a construction of the mono-fiber cord of the present invention.

Here, the construction of the strength rods includes a case in which a plurality of strength rods are applied in a side-by-side manner to configure a flat member as a whole as shown in FIG. 1 and FIGS. 3 to 7, and a case in which only one flat strength rod is applied to configure a flat member as shown in FIGS. 14 to 16. In FIG. 1, A and B denote a longer side and a shorter side of the sectional surface of the optical fiber cord 1, respectively. It is preferable if the two strength rods 14 are in contact with the coated optical fiber 13, and located in the symmetrical manner with respect to the center axis line C of the sectional surface of the cord, which is in parallel with the longer sides of the optical fiber cord 1.

As a material for the fiber coat 12 and the coat for mono-fiber cord 15, the most popular one to be adopted is an ultraviolet-curing acrylic resin. The elastic modulus of the acrylic resin can be easily adjusted in a wide range. Because the fiber coat 12 functions as a cushion layer, a micro-bend of the optical fiber caused by the thermal shrinking of the outer sheath can be effectively prevented, so that an optical loss can be minimized.

As the strength rod 14, steel, simple glass fiber or fiber-reinforced plastics (hereinafter referred to just as "FRP") can be adopted. Steel is effective for acquiring large strength and flexural rigidity, due to the fact that its elastic coefficient is higher than that of other materials. The steel rod can be made in a simple mono-filament structure or in a strand by stranding a plurality of very thin wires, but the mono-filament structure is more suitable for the strength rod 14 of the present invention, as it can give larger flexural rigidity and higher compression durability to the optical cord. In a case in which generally used steel is adopted for the strength member 14, it is preferable to apply an anti-rust process such as enamel coating or plating thereto. However, if a stainless steel is adopted for the strength rod 14, such a process is not necessary.

In a case in which a simple glass fiber is adopted as the strength rod 14, a pure-silica glass, which is produced by the same process as that for producing the optical fiber 11 is most suitable. Since the pure-silica glass is chemically synthesized, contaminations and defects are very rare, and thus the strength thereof is quite high. However, the coating process for protecting the surface of the pure-silica glass is essential. It suffices that the coating applied thereto is of several- micron thick, so that such a material as epoxy whose elastic modulus is quite high may be employed. If a material that can improve the bondage with the coat for mono-fiber cord 15 is selected as a coating material, the characteristic for reinforcing the glass rod can be raised. It goes without saying that the coating for the glass fiber as the strength rod 14 can be the same material as that of the optical fiber coat 12, and in this case, it can be readily manufactured. Since this simple glass fiber is used only as the strength rod 14, no core structure for leading lights therein is necessary, so that the dimension thereof can be made much more roughly than when it is used as an optical fiber, enabling thus its manufacturing at quite a low cost.

Furthermore, as the strength rod 14, an FRP can be used, which is produced by hardening, for example, aramid yarn, PBO (polyparaphenylenebenzobisoxazole) yarn, glass fiber yarn, or carbon fiber yarn, with epoxy resin. In FIG. 1, coating for the strength rod 14 itself is not shown, and this is because there is a case in which, as mentioned hereinabove, it is essential to have a coating layer just like the case of the glass fiber, and also a case in which it is not necessary just like the case of the steel wire. There is also a case in which although a coating layer is not necessary for maintaining the durability of the material, a colored coat may be applied to the strength member just for identifying the optical fiber cords.

Conventionally, the optical fiber cord is constructed such that a plurality of reinforcing members are applied around the coated optical fiber, and PVC (polyvinyl chloride) jacket is further applied thereto. However, since an optical fiber cord of the present invention is constructed such that it is not provided with a plurality of reinforcing members surrounding the entire external surface of the coated fiber, and that it can be changed into a suitable structure for constructing an optical cord ribbon by combining a plurality of mono-fiber cord units, and also since it is structured in such a manner as to enable to greatly minimize the sectional area of each mono-fiber cord unit, the optical cord ribbon as a whole can be made extremely light and small in size.

Figure 22:
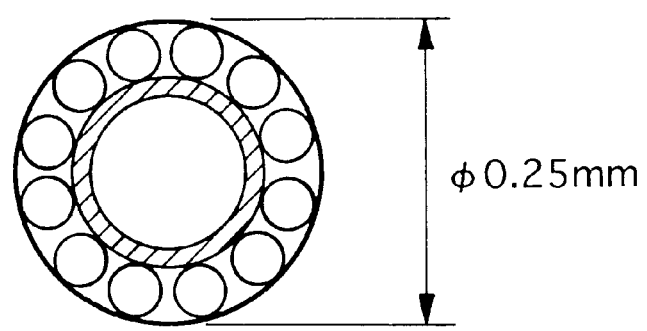
FIG. 22 is a sectional view showing a structure of the conventional small-diameter optical mono-fiber cord.

By the way, although the conventional optical fiber cord shown in FIG. 22 has a diameter of 0.25 mm, and thus the sectional area thereof is smaller than that of the present invention, the optical fiber cord of the present invention features that the coat is readily removed, the construction thereof is simple, and it can use the standard coated optical fibers of 0.25 mm-diameter, so that it is suitable for economizing the whole construction.

Figure 2:
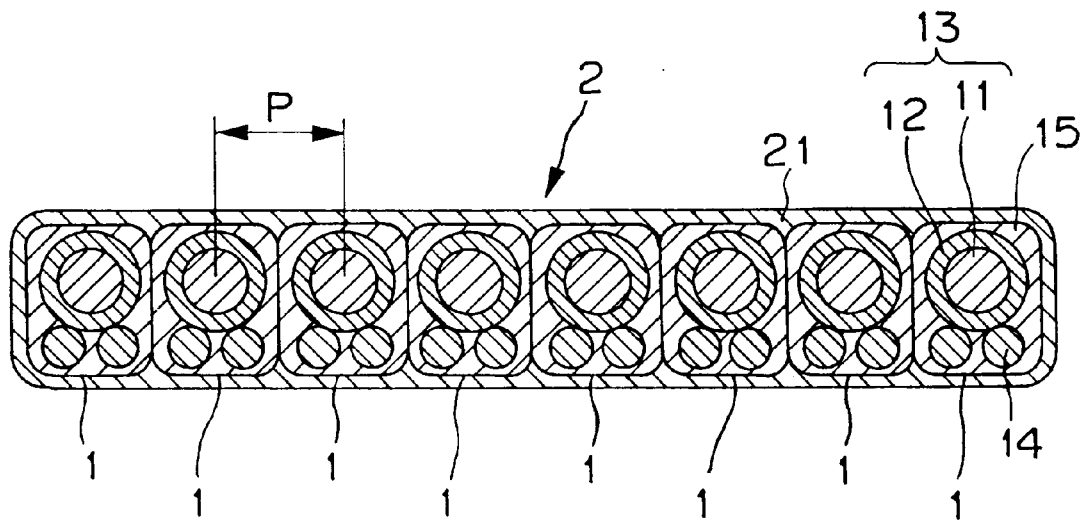
FIG. 2 is a sectional view showing one embodiment of a construction of an optical cord ribbon of the present invention.

FIG. 2 is a sectional view showing an example of the optical cord ribbon of the present invention. In FIG. 2, the mono-fiber cord shown in FIG. 1 is considered to be one unit, and a plurality of these units are used therein. Here, one of the longer sides B of one unit optical fiber cord 1 and that of the other unit optical fiber cord 1 are mutually bonded and made integral, and a bundling coat 21 is applied to the thus integrated structure so as to form a ribbon. For this operation, a plurality of mono-fiber cords must be arranged such that the mutually facing longer sides B of the adjacent sectional surfaces thereof are brought into contact, and that the strength rods 14 of the respective fiber cord units are aligned in a side-by-side manner. It is to be noted that instead of applying the bundling coat 21, it will be sufficient if only the mutually contacting surfaces of the mono-fiber cord units are bonded. Further, it can be even arranged in such a manner as to bond the mutual contacting surfaces first, and thereafter to apply the bundling coat.

Figure 20:
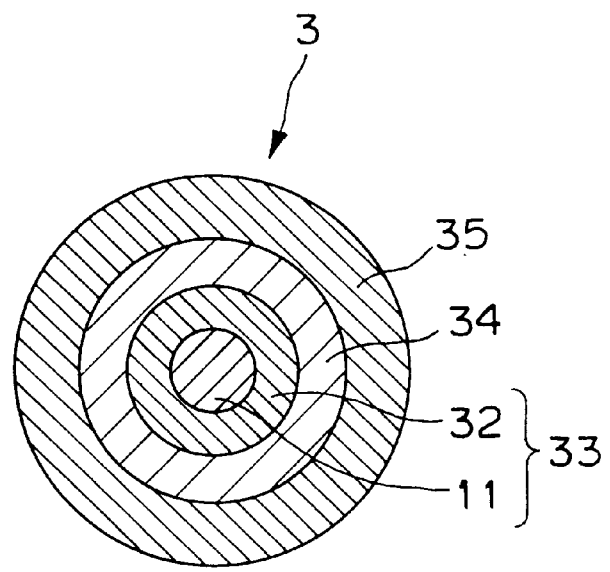
FIG. 20 is a sectional view showing a structure of the conventional optical mono-fiber cord.
Figure 21:
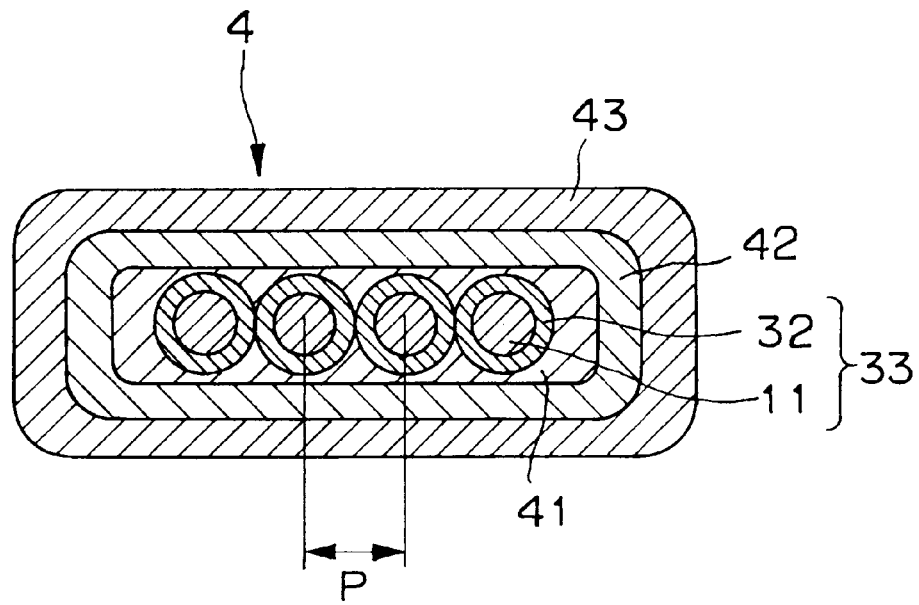
FIG. 21 is a sectional view showing a structure of the conventional optical cord ribbon.

In this embodiment, the shorter side A of the mono-fiber cord 1 is arranged in such a manner that the interval between two adjacent mono-fiber cord units when they are aligned with their longer sides B mutually contacted is equal to the interval P (FIG. 21) between the two adjacent coated fibers in a conventionally used optical fiber ribbon. Considering the fact that this interval P in the conventional optical fiber ribbon is set to 0.25 mm, the sectional area of the mono-fiber cord 1 will be: longer side×shorter side, or 0.25 mm×0.4 mm, approximately. The sectional area of the optical fiber cord 1 of the present invention is 1/30 of the case of a commercially available optical fiber cord having an outside diameter of 2 mm as shown in FIG. 20.

In the structure of the mono-fiber cord 1 of the present invention, it is preferable to locate the optical fiber 11 in the center of the width (shown by an arrow A) of sectional surface of the fiber cord, or the center axis C thereof. By this arrangement of symmetrical arrangement of the optical fiber within a unit, the alignment for making a ribbon together with other optical fiber cords will be facilitated. The optical fiber ribbons currently used in Japan include 4 or 8 fibers, and the optical fiber ribbons of 16 fibers are now being developed. Further, the optical fiber ribbons of 12 fibers are used in other countries. It is preferable to adjust the number of mono-fiber cords to be accommodated within an optical cord ribbon of the present invention to that of the number of the fibers in an optical fiber ribbon to be connected.

Even though the interval between the adjacent coated fibers accommodated within the optical cord ribbon of the present invention is deflected from 0.25 mm to 0.27 mm, it will not become an impediment for its connection to a conventional optical fiber ribbon, so that it is possible to construct an optical fiber cord of the present invention having an outside diameter of 0.27 mm including a coat for mono-fiber cord 15, by use of a coated fiber having a standard outside diameter of 0.25 mm. By this arrangement, the coated fibers of the present invention can be commonly used with a conventional optical fiber ribbon to enable a mass-production thereof, and thus they can be produced at a substantially low cost compared with the case in which the specific dimension is required.

On the other hand, even when a standard coated fiber having an outside diameter of 0.25 mm is used, since the fiber coat is normally formed of two layers, namely inner and outer layers, each having different elastic modulus, the interval between two adjacent optical fibers can be made less than 0.25 mm by using optical fibers without the outer layers. For example, if the interval is approximately 0.23 mm, it can be connected with an optical fiber ribbon having an interval of 0.25 mm between two adjacent optical fibers therein without any serious problem.

In FIGS. 3 to 7, five further different embodiments of the strength member of the present invention are shown, in each of which the construction as a whole is same as that of FIG. 1 except that the respective shapes of the strength rods as the strength member are different from one another.

Figure 3:
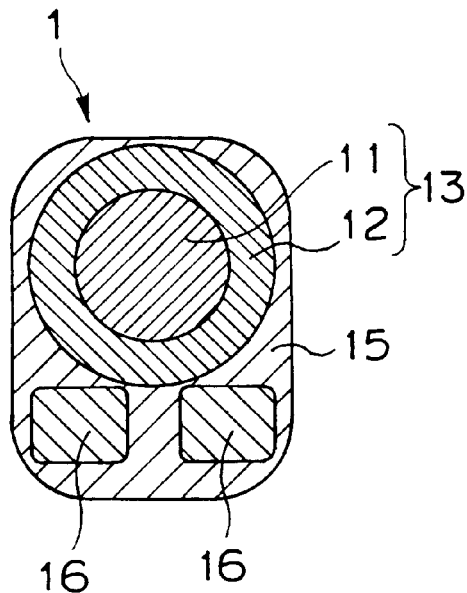
FIG. 3 is a sectional view showing another embodiment of a construction of the mono-fiber cord of the present invention.
Figure 4:
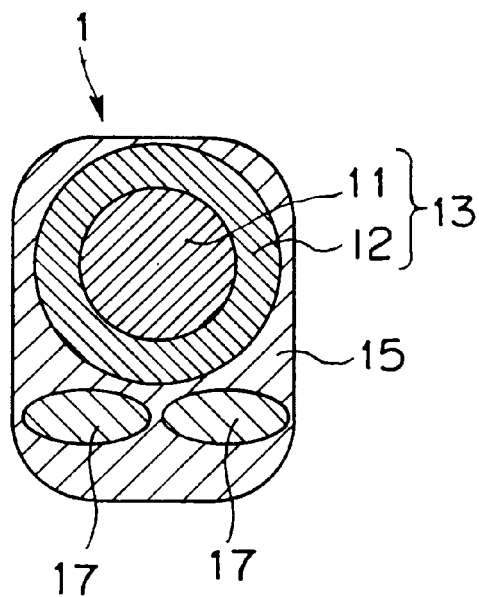
FIG. 4 is a sectional view showing another embodiment of a construction of the mono-fiber cord of the present invention.
Figure 5:
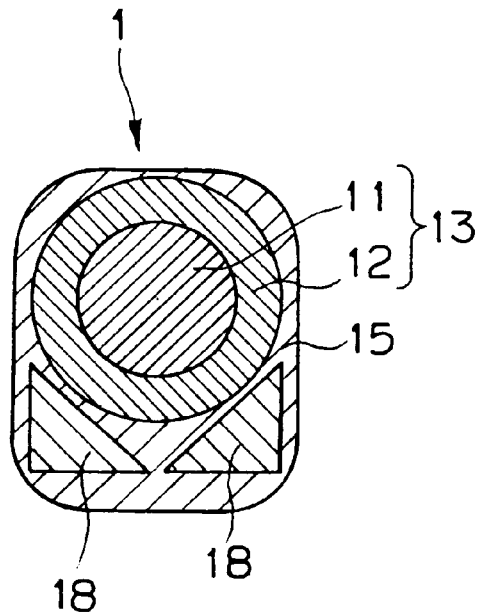
FIG. 5 is a sectional view showing another embodiment of a construction of the mono-fiber cord of the present invention.
Figure 6:
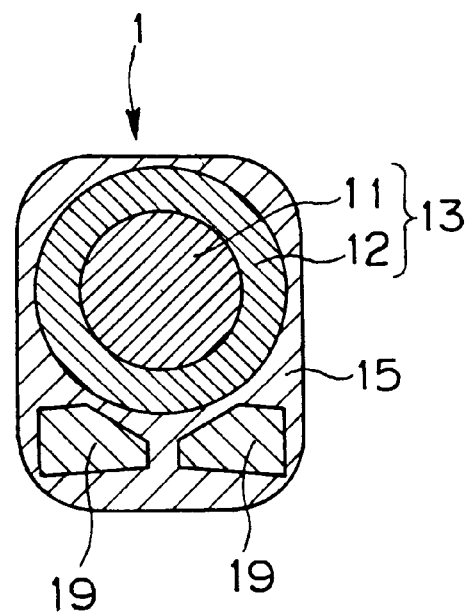
FIG. 6 is a sectional view showing another embodiment of a construction of the mono-fiber cord of the present invention.
Figure 7:
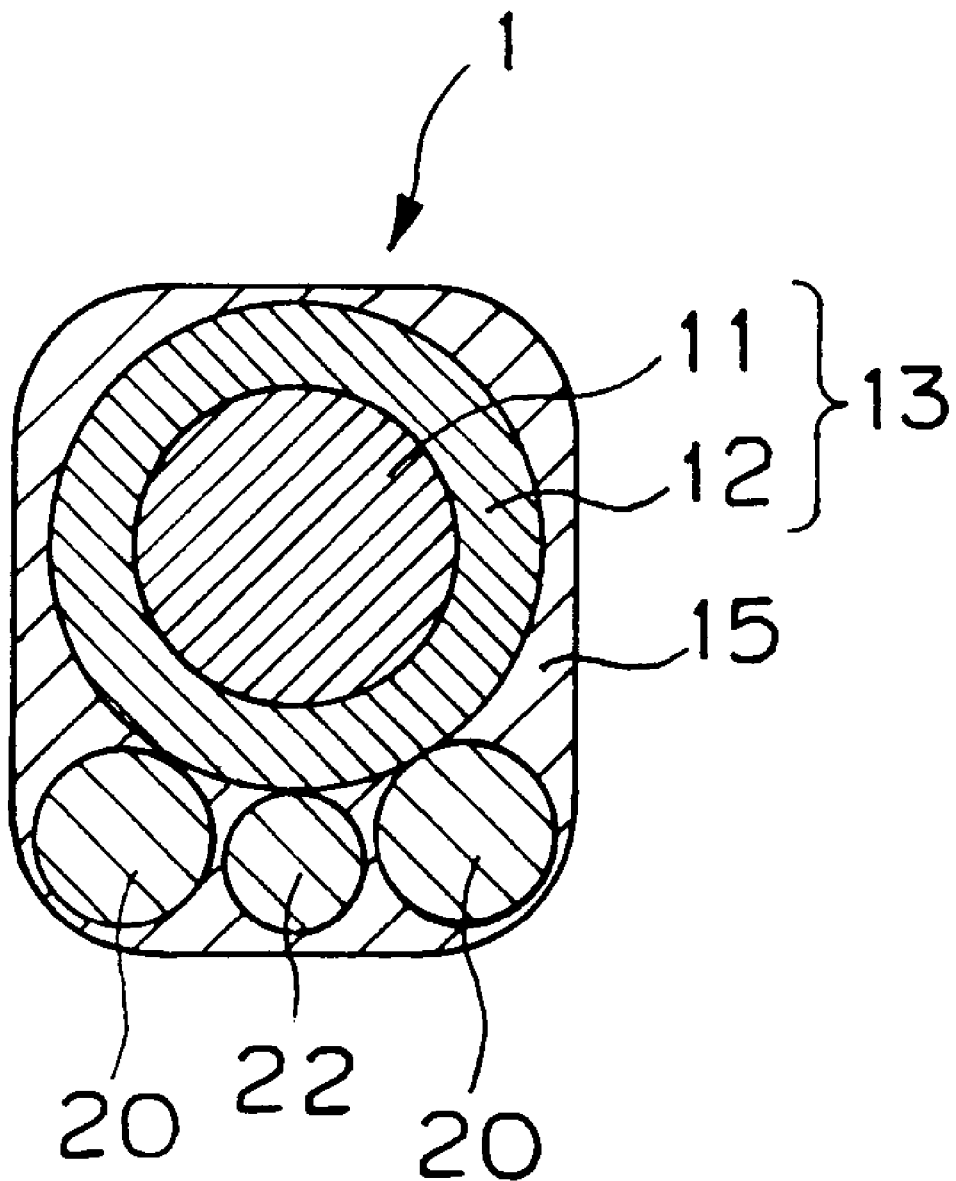
FIG. 7 is a sectional view showing another embodiment of a construction of the mono-fiber cord of the present invention.

In FIG. 3, a pair of strength rods 16 are used, the sectional surface of each being a rectangular, or substantially rectangular formed by making the respective four corners thereof rounded. In FIG. 4, a pair of strength rods 17 are used, the sectional surface of each being oval, or elongated circle. In FIG. 5, a pair of strength rods 18 are used, the sectional surface of each being a right-angled triangle, or a substantially right-angled triangle formed by making the respective three corners thereof rounded, wherein each of the oblique sides is close to the coated optical fiber. In FIG. 6, a pair of strength rods 19 are used, the sectional surface of each being substantially pentagon, which is formed by removing the corner at the close proximity of the coated optical fiber from the rectangular of the embodiment of FIG. 3. In FIG. 7, three circular strength rods 20, 20, and 22 are used. In this case, it is preferable to form the rod 22 sandwiched between the other two rods 20 smaller in diameter than that of the rod 20, so as to make the outer side surfaces of these three rods aligned to one level.

It is to be noted that for connecting the optical fiber cord of the present invention, it is necessary to remove the strength rods and the coat applied therearound. In order to explain as simply as possible, the case of the optical mono-fiber cord having the structure of FIG. 1, and the case of the optical cord ribbon having the structure of FIG. 2 are explained. First of all, the method of removing the strength rods about the case in which the strength rods 14 are made of either steel wire or FRP is explained, taking up the structure of the optical cord ribbon 2 as an example.

First, make a flaw on the coated optical fiber 13 by pushing a blade against or scratching with it the surface where the optical fiber 11 resides, at a position relevant length away from the far end of the optical cord ribbon 2, and bend the cord ribbon 2 in the direction in which the thus made flaw faces outside. By this manual work, the coated optical fiber 13 is broken at the position 31 in FIG. 8, while the strength rods 14 are not broken.

Figure 8:
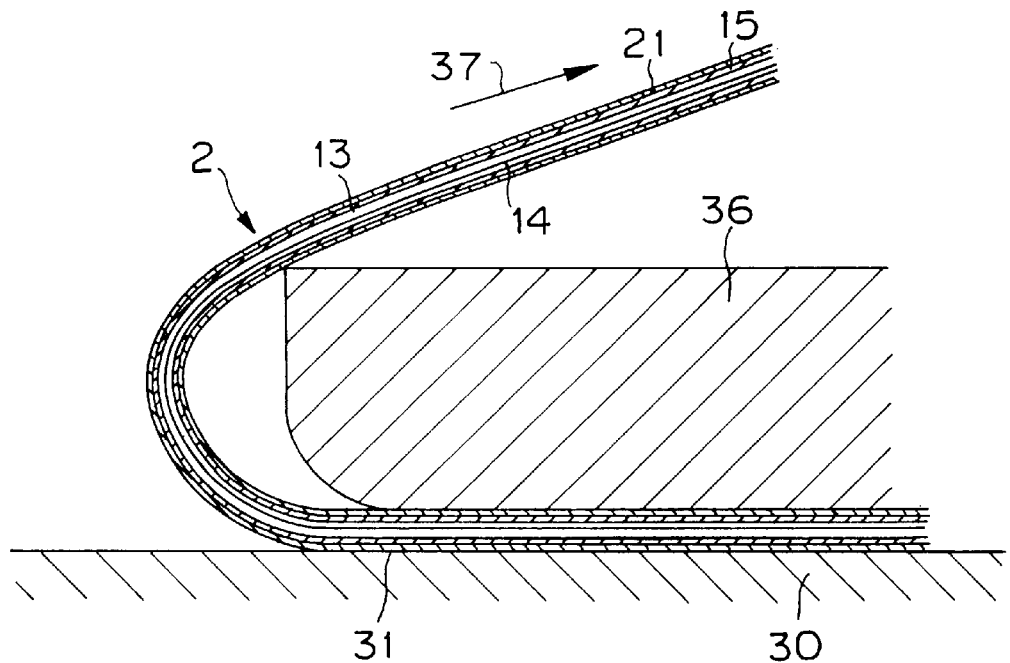
FIG. 8 is an explanatory view showing a method of removing the strength members and the coat thereof from the optical cord ribbon of the present invention.

Next, as shown in FIG. 8, put the optical cord ribbon 2 on the plane 30 in such a manner that the coated optical fiber 13 resides close to the plane 30. Thereafter, put a flat plate 36 on the optical cord ribbon 2 at the position near the broken point 31, and draw the far end of the optical fiber cord 1 in the direction shown by an arrow 37, softly pressing this flat plate 36 against the optical cord ribbon 2 simultaneously. By this operation, the bundling coat 21 and the coat for mono-fiber cord 15 are broken, and the strength rods 14 and the coated optical fiber 13 can be thus divided.

Figure 9:
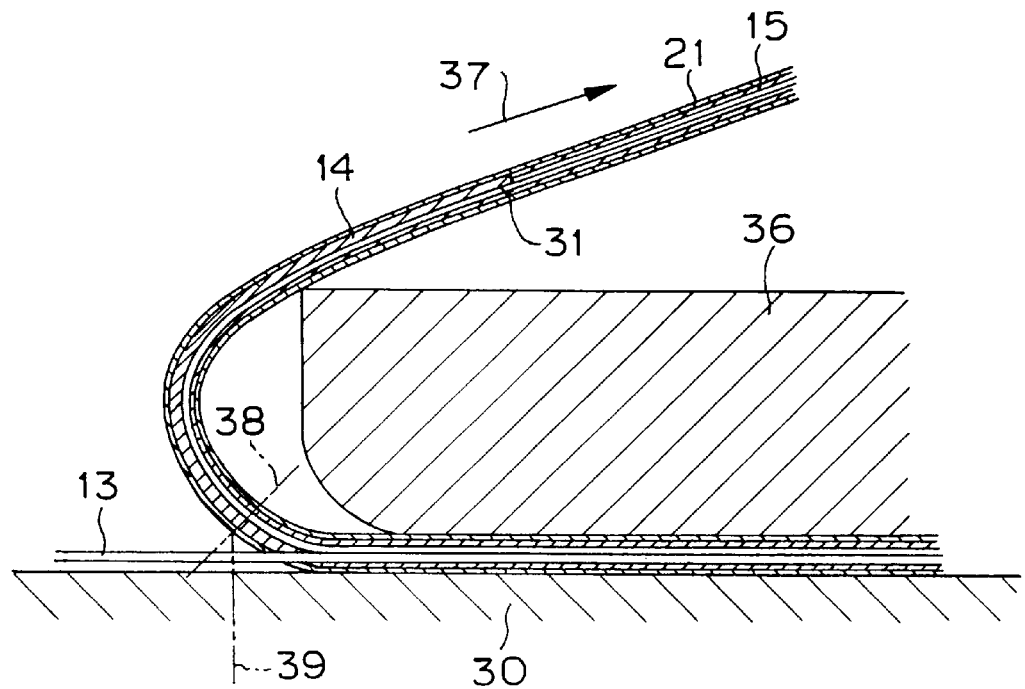
FIG. 9 is an explanatory view showing a method of removing the strength members and the coat thereof from the optical cord ribbon of the present invention.

Thereafter, as shown in FIG. 9, by drawing further the optical cord ribbon 2, it is slid along the bottom surface of the flat plate 36 to be drawn out, and the strength member 14 and the coated optical fiber 13 are separated from each other. Then, when the separated portion comes to a relevant length, cut off the strength member 14 at the root portion 38 of the separation by a pair of scissors or a nipper. Removal of the fiber coat 12 can be performed in the same way as that for peeling off the coat for normal coated fibers, namely by pushing a blade against root portion 39 from both the upper and the lower sides of the optical cord ribbon 2.

Next, the method of removing the strength rods and the coat for mono-fiber cord is explained about the case in which the strength rods 14 are made of glass fiber, taking up the structure of the optical cord ribbon 2.

First, make a flaw on the coated optical fiber 13 by pushing a blade against or scratching with it the surface where the glass fiber 14 resides, at a position relevant length away from the far end of the optical cord ribbon 2, and bend the cord ribbon 2 in the direction in which the thus made flaw faces outside. By doing so, the glass fiber 14 is broken, while the optical fiber 11 is not broken. From this position, press the blade against also the surface of the opposite side of the coat and move the thus pushed blade toward the far end of the shorter portion of the optical cored ribbon 2 to peel the coat off, while maintaining the longer side thereof at the same position.

The connecting method after the removal of the strength rods and the coat is same as the conventional method for mutually connecting optical fiber ribbons. Further, the connection between the optical cord ribbon and mono-fiber cords can be performed by the same procedure after dividing the optical cord ribbon into individual mono-fiber cord units. Still further, as the optical fiber cords of the present invention can be divided into individual units, and thus there is no need for providing a connecting portion when converting into the mono-fiber cords, which is a great advantage. If an optical connector is individually provided to the end portion of the thus converted mono-fiber cord, the number of fiber connecting points in the middle of the distribution can be greatly reduced.

Next, the advantages obtained by providing two strength rods in the mono-fiber cord of the present invention will now be explained. This structure is determined from the consideration about flexural rigidity, and the inventor of this invention has discovered the superiority of this structure to that in which only one strength rod of circular cross-section is provided.

Figure 10:
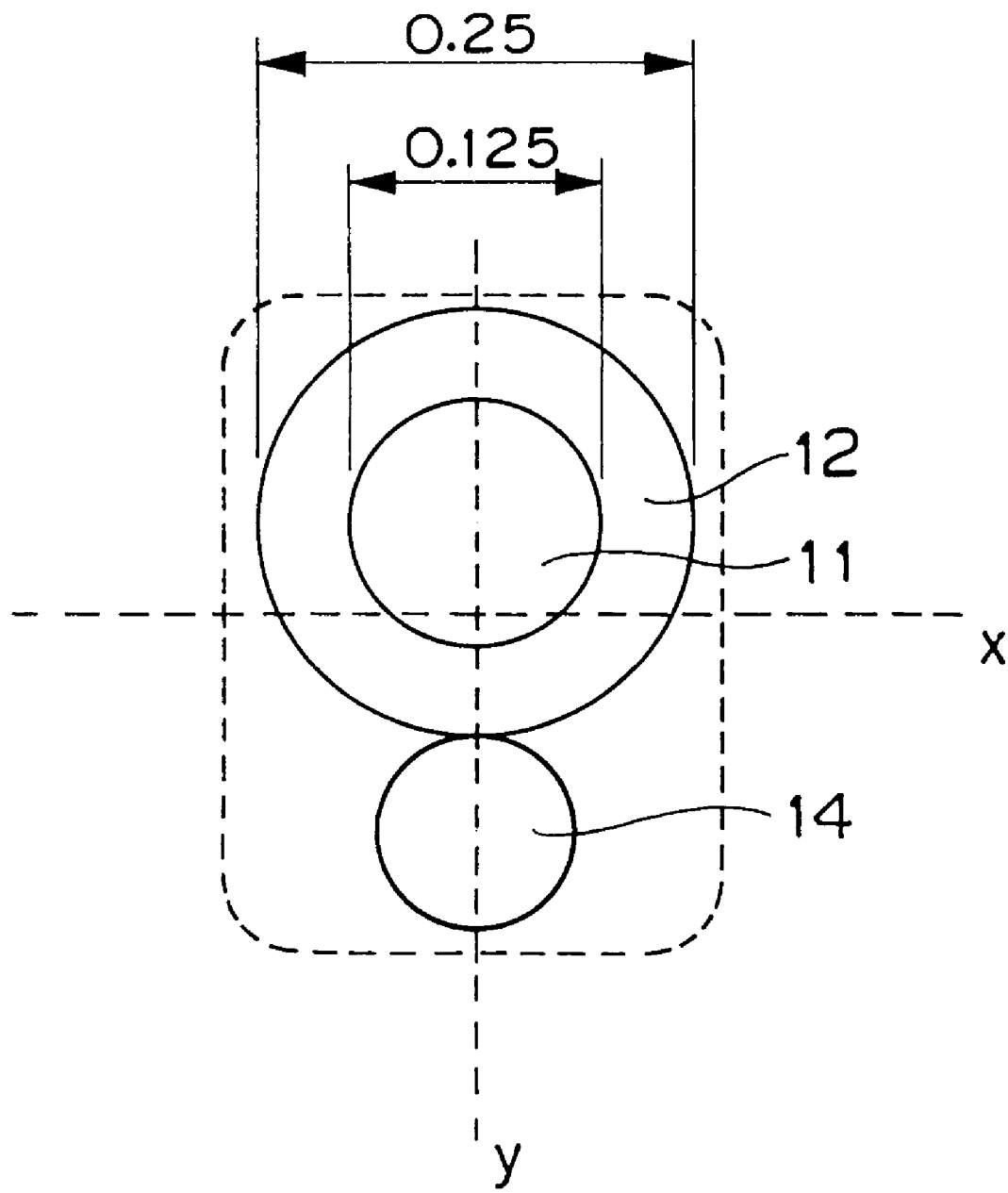
FIG. 10 is an illustration showing an analytical model.
Figure 11:
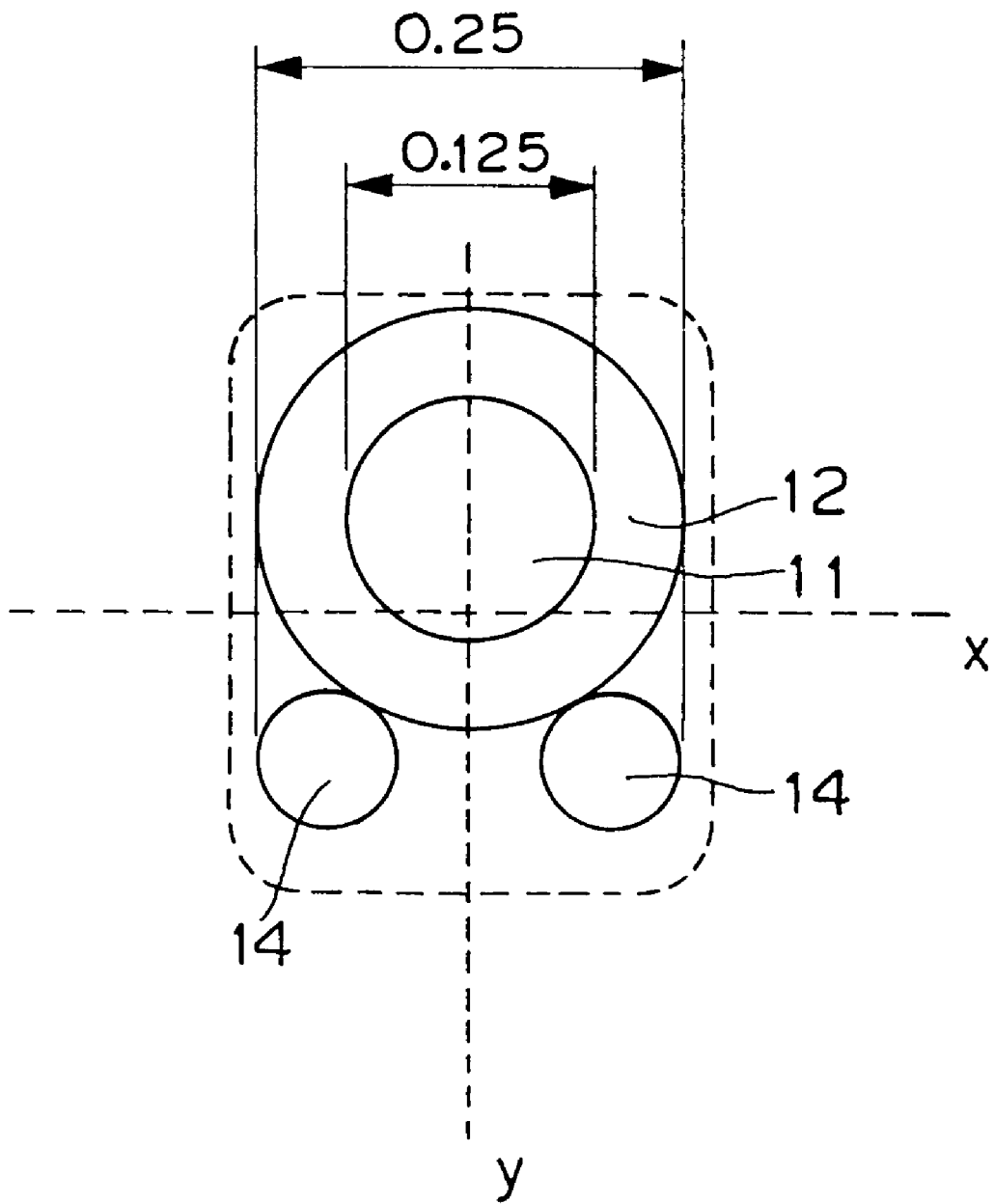
FIG. 11 is an illustration showing an analytical model.

FIGS. 10 and 11 are illustrations respectively showing an analytical model for this structure, wherein FIG. 10 explains the case in which only one strength rod is used, and FIG. 11 explains the case in which two strength rods are used. This analysis is based on the assumption that a standard coated optical fiber (the outside diameter of the optical fiber 0.125 mm, and that of the fiber coat is 0.25 mm) is used, and the strength rods 14 are in contact with the coated optical fiber as shown in FIGS. 10 and 11.

In this analysis, it is arranged such that the elastic modulus (Young's modulus) for the optical fiber is 7200 kgf/mm$^2$, and that for the mono-filament steel wire is 21000 kgf/mm². As the elastic modulus of the both optical fiber coat and the coat for mono-fiber cord is quite small, and hardly contributes to the flexural rigidity, it is ignored in the model case. In FIGS. 10 and 11, the lines indicated by x and y are neutral surfaces of applied bending force respectively. In the case of a mono-fiber cord shown in FIG. 10, normally y is the neutral surface, as the flexural rigidity at this direction is lowest. On the other hand, in the case of an optical cord ribbon shown in FIG. 11, x is the neutral surface. By use of these values, the flexural rigidity of the respective cases is calculated in accordance with the theory of elasticity.

Figure 12:
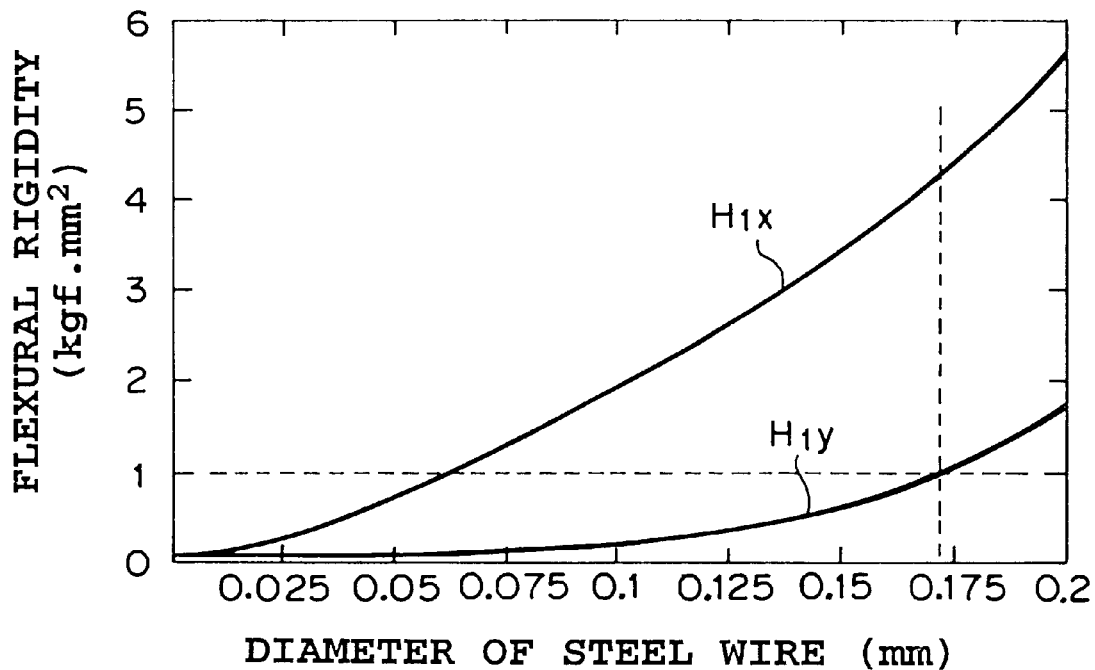
FIG. 12 is a characteristic view showing a calculated result of the relationship between the diameter of the strength member (steel wire) and flexural rigidity of the optical fiber cord.
Figure 13:
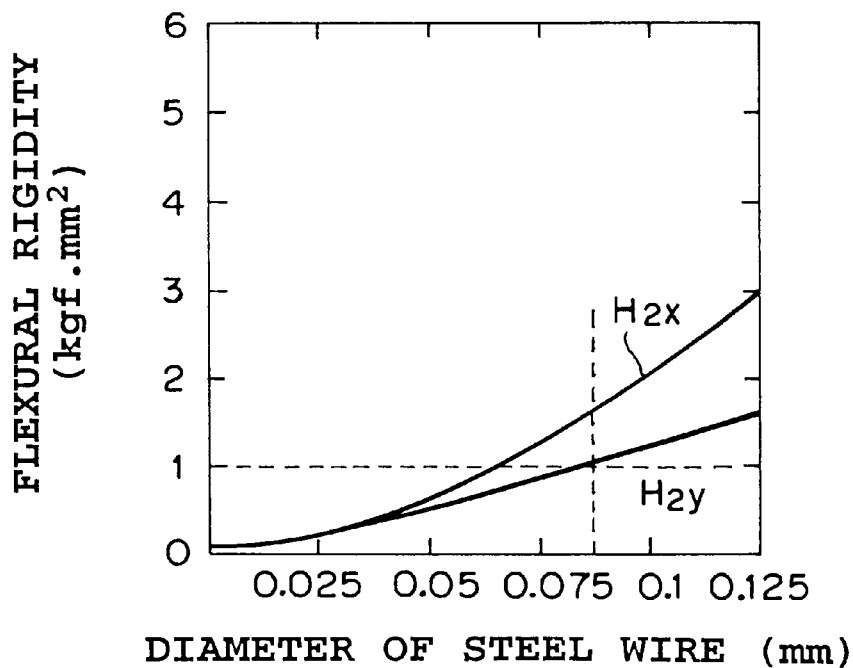
FIG. 13 is a characteristic view showing a calculated result of the relationship between the diameter of the strength member (steel wire) and flexural rigidity of the optical fiber cord.

Regarding the optical fiber cords as shown in FIGS. 10 and 11, the result of the calculation about the relation between the diameter of the strength rod (steel wire) and the flexural rigidity of the optical fiber cord are shown, respectively in FIG. 12 and FIG. 13. In FIG. 12, H1x and H1y indicate flexural rigidity of the respective neutral surfaces x and y in a case in which only one steel wire is provided, whereas in FIG. 13, H2x and H2y indicate flexural rigidity of the respective neutral surfaces x and y in a case in which two steel wires are provided. In this calculation model, the upper limit of the diameter of the steel wire is 0.25 mm when there is only one steel wire, and 0.125 mm when there are two.

For the mono-fiber cord, it is preferable to make the flexural rigidity large. However, in the case of only one steel wire, H1y and H1x are quite different from each other, so that when the diameter of the steel wire is made large, even though the value of H1y is not so increased, that of H1x is largely increased. For example, for making the flexural rigidity of the mono-fiber cord to 1 kgf.mm², the diameter of the steel wire should be 0.17 mm in consideration for the value of H1y. However, since the value of the H1x of this moment is 4.3 kgf.mm², the flexural rigidity of the case of 8-fiber optical cord ribbon becomes 35 kgf.mm², which is too large for practical handling because of the lack of flexibility.

On the other hand, in the case that two steel wires are used as the strength member, the value of H2x and that of H2y are relatively close to each other. When the flexural rigidity of mono-fiber cord is set to 1 kgf.mm², the diameter of the steel wire will be approximately 0.085 mm from the curve line of H2y, and the value of H2x thus becomes approximately 1.55 kgf.mm², whereby when it is made to be 8-fiber optical cord ribbon, the flexural rigidity becomes approximately 12.4 kgf.mm².

The case that two steel wires 14 are used as the strength member as one embodiment of the present invention is now compared with a conventional structure.

The flexural rigidity of a conventional mono-fiber cord with an outside diameter of 1.7 mm or 2.0 mm will be approximately 3 to 5 kgf.mm². Although the flexural rigidity of the above mono-fiber cord is 1 kgf.mm² which is smaller than this 3 to 5 kgf.mm², it is more or less the same as that of the conventional nylon coated optical fiber with an outside diameter of 0.9 mm, and thus it is satisfactory. Further, although the optical fiber ribbon is often distributed with a nylon protective tube covering therearound, the flexural rigidity of the coat of this case will be approximately 10 to 15 kgf.mm², and thus, the calculated result of the case of the above two steel wires conforms to it and thus satisfactory.

As explained hereinabove, an optical fiber cord adopting two strength rods according to the present invention is suitable for a mono-fiber cord and also for an optical cord ribbon which is configured by gathering a plurality of mono-fiber cords each used as one unit. Further, as each of the two strength rods can be formed smaller than when only one strength rod is used, there is an advantage in that when constructing an optical cord ribbon, the distance between the neutral surface and the optical fiber axis when being bent becomes short. When the optical cord ribbon is bent with a radius of 30 mm, a strain generated on the surface of the optical fiber will be 0.81% in the case of only one strength rod, whereas it will be 0.56% in the case of two strength rods, both from calculation using the aforementioned numeric values, so that the present invention features that a destruction at the bent portion hardly occurs.

In order to further improve the mechanical reliability against bending deformation, carbon coat optical fiber may be used. This optical fiber is formed such that the surface thereof covered with a carbon layer of as thin as 0.1 μm or less than that, whereby a static fatigue hardly occurs, and therefore many are used for marine optical fiber cables. Still further, in order to minimize the surface strain due to the bending action, it suffices that the coat for optical fiber is made thin. Although such a construction of the present invention that the strength rods are eccentrically located, the surface strain due to the bending action becomes large, it can be coped with as explained hereinabove.

In the aforementioned embodiments, the case in which two strength rods are used has been explained, the present invention is not limited to this, but even with a structure in which only one flat strength rod is used as shown in FIGS. 14 to 16, it can obtain the same flexural rigidity as that obtained by the structure shown in FIG. 1 in which two strength rods are used.

In the embodiments shown in FIGS. 14 to 16, the same reference numerals are put to the same or similar members for the structure in FIGS. 3 to 6, in order to omit explanation thereabout.

In FIG. 14, a strength rod 44, whose sectional surface is either a rectangular, or substantially rectangular having its four corners rounded, oval or elongate circle, is located in the close proximity to the coated optical fiber 13.

In FIG. 15, a strength rod 45, whose sectional surface is semi-rectangular (which indicates a more roughly made rectangular than an already imperfect "substantially rectangular") with a concave portion 45A along the external surface of the coated optical fiber 13 at the side facing to the fiber 13, is located facing to the coated optical fiber 13 in the close proximity thereto. By this structure, since the entire strength rod can be located nearer to the coated optical fiber than that in FIG. 14, the direction dependency of the flexural rigidity can be made smaller. Here, the shape of the concave portion 45A is preferably made in such an ideal structure that it faces along the external surface of the coat 12, it also may be constructed in other shapes, for example, a triangle and so on.

In FIG. 16, a strength rod 46, whose sectional surface is rectangular, or substantially rectangular with its four corners rounded, and also a semi-rectangular bent along with the external surface of the coated optical fiber 13 at the side facing to the fiber 13 in such a manner that the external surface is made concave, is located in the close proximity to the coated optical fiber 13.

Figure 17:
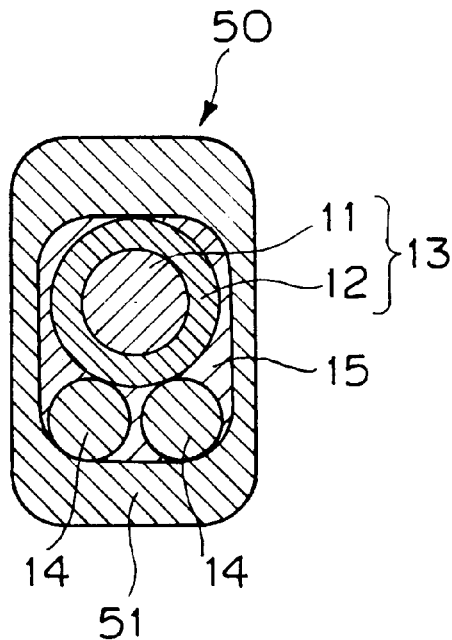
FIG. 17 is a sectional view showing another embodiment of a construction of the mono-fiber cord of the present invention.
Figure 18:
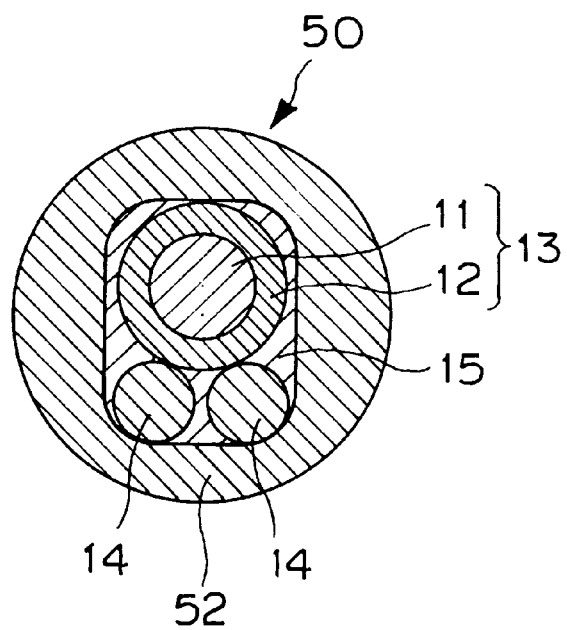
FIG. 18 is a sectional view showing another embodiment of a construction of the mono-fiber cord of the present invention.
Figure 19:
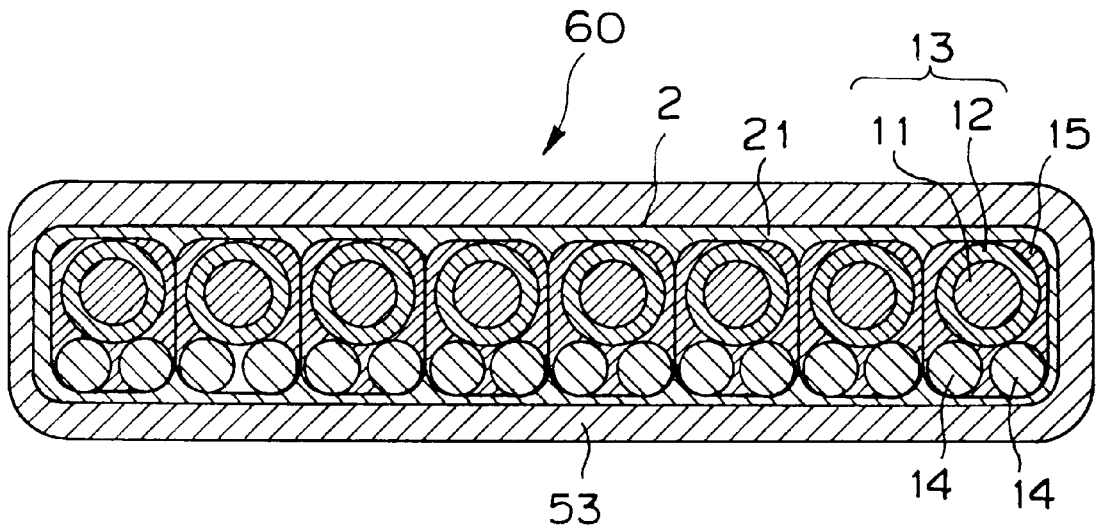
FIG. 19 is a sectional view showing another embodiment of a construction of the optical cord ribbon of the present invention.

Further, a protection jacket using ultraviolet curing resin can be applied around the aforementioned various embodiments of the mono-fiber cord, or of the optical cord ribbon which is formed by bonding a plurality of mono-fiber cords in a side-by-side manner, for example as shown in FIGS. 17, 18 and 19.

In fact, this ultraviolet curing resin is used in many occasions as a coating material for optical fibers, and is of urethane-acrylic, which is cured in an extremely short time by irradiation of ultraviolet ray. This resin features that it can cope with a wide range of materials from soft coating layer to strong protection jacket by modifying its composition. As the commercially available material, there is Desolite (TradeMark) by JSR Corporation, whose head-office resides in Tokyo, Japan.

For facilitating the division of the cord ribbon to individual mono-fiber cords, the respective coating characteristics for the mono-fiber cord and that for the optical cord ribbon should be made different. In the dividing operation, as it is important to prevent the coating material for the optical cord ribbon from being destroyed, and prevent the mono-fiber cord from being damaged, it. is preferable to arrange such that the former is destroyed more easily than the latter. This material can be evaluated by a detected strength in a tension test. In other words, it is preferable to arrange such that the breaking strength of the latter is larger than that of the former. Even in this structure, removal of the coat for optical fiber for its later connection can be readily executed only by cutting into more deeply than the case of the structure of FIG. 1.

As one of the aforementioned structures, the mono-fiber cord 50 is shown in FIG. 17, which is constructed by applying a protection jacket whose sectional surface is substantially rectangular around the optical fiber cord shown in FIG. 1. By this structure, damages by scratching or the like can be efficiently avoided. Besides, as the side surface thereof becomes flat, an optical fiber cord numbers, an identification code, identification color or the like can be readily printed thereon.

In FIG. 18, a protection jacket 52 of a circular sectional surface is used instead of the protection jacket 51. By this embodiment, not only damages by scratching or the like can be efficiently avoided, but as the sectional surface is circular, an easy cabling operation and installation of connectors are made possible.

In FIG. 19, there is shown an optical cord ribbon 60 which is configured by applying a protection jacket 53 around the bundling coat 21 of the optical cord ribbon 2 configured by bonding the longer sides of the mutually adjacent mono-fiber cord units 1. By this embodiment, not only damages by scratching or the like can be efficiently avoided, but, as the side surface becomes flat, an optical fiber cord number, an identification code, identification color or the like can be readily printed thereon.

The protection jackets 51, 52 and 53 can be made of polyvinyl chloride, polyamide, polyethylene, and also of synthetic rubber such as isoprene, polychloroprene and butyl rubber. Further, the protection jackets 51, 52 and 53 can be made of the same material as those for the coat for mono-fiber cord 15, or of the bundling coat 21.

As explained heretofore, the size of the mono-fiber cord can be minimized and lightened by putting a generally flat strength rod along the longitudinal direction of the coated fiber, for example one or more than one strength rods of high-elastic modulus as the strength member, the destruction thereof due to the bending force can be prevented. Besides, in the mono-fiber cord of the present invention, as the strength rods are eccentrically located to one side of the coated fiber, an optical cord ribbon is readily composed by combining a plurality of mono-fiber cords. Therefore, according to the optical cord ribbon of the present invention, since the strength rods are eccentrically located to one side, these strength rods can be readily removed when the optical fiber is to be connected. Still further, according to the optical cord ribbon of the present invention, the multi-mono cord conversion can be executed only by removing the outer sheath.

The present invention has been described in detail with respect to various embodiments, and it will now be apparent from the foregoing to those skilled in the art that changes and modifications may be made without departing from the invention in its broader aspects, and it is the intention, therefore, in the appended claims to cover all such changes and modifications as fall within the true spirit of the invention.

What is claimed is:

1. A mono-fiber type optical fiber cord comprising:

a coated optical fiber composed of an optical fiber and a fiber coat for covering said optical fiber;

a coat for coated optical fiber that covers said coated fiber, and having a substantially rectangular sectional surface; and a reinforcing member within said coat for coated optical fiber, said reinforcing member being comprised of a plurality of strength rods, wherein said plurality of strength rods are located along one of the shorter sides of said coat in the substantially parallel direction with said shorter sides in such a manner as to be embedded along the longitudinally extending direction of said coated optical fiber.

2. A mono-fiber type optical fiber cord as claimed in claim 1, wherein said plurality of strength rods are two rods which are located in a symmetrical relation with respect to the center axis of said optical fiber cord, in parallel with the longer sides thereof, and being in contact with said coated optical fiber.

3. A mono-fiber type optical fiber cord as claimed in claim 1, wherein the sectional surface of each of said two strength rods is a circle.

4. A mono-fiber type optical fiber cord as claimed in claim 1, wherein the sectional surface of each of said two strength rods is substantially rectangular.

5. A mono-fiber type optical fiber cord as claimed in claim 1, wherein the sectional surface of each of said two strength rods is elongate circle extending along said shorter side direction of said optical fiber cord.

6. A mono-fiber type optical fiber cord as claimed in claim 1, wherein the sectional surface of each of said two strength rods is a substantially right-angled triangle, whose oblique side is located in the close proximity of the said coated optical fiber.

7. A mono-fiber type optical fiber cord as claimed in claim 1, wherein the sectional surface of each of said two strength rods is a substantially pentagon having one side which is located in the close proximity of the said coated optical fiber.

8. A mono-fiber type optical fiber cord as claimed in claim 1, wherein said plurality of strength rods are composed of one strength rod which is located on the center axis of said coat for coated optical fiber in parallel with the longer side thereof, and a pair of strength rods each having larger diameter than that of said one strength rod and located in a symmetric relation with respect to the center axis, sandwiching said one strength rod.

9. A mono-fiber type optical fiber cord as claimed in claim 1, wherein said fiber cord further comprises a protection jacket coating therearound.

10. A mono-fiber type optical fiber cord as claimed in claim 9, wherein the sectional surface of said protection jacket is circular, or substantially square.

11. A mono-fiber type optical fiber cord as claimed in claim 9, wherein said reinforcing member comprises a colored coat for identification.

12. A mono-fiber type optical fiber cord as claimed in claim 9, wherein said fiber coat and said protection jacket are made of ultraviolet curing resin, in such a manner that said protection jacket is more easily destroyable than said fiber coat.

13. A mono-fiber type optical fiber cord as claimed in claim 9, wherein said protection jacket is made of synthetic resin which is different from said coat for coated optical fiber.

* * * * *